(No Model.)

G. W. HARRINGTON.
METHOD OF FORMING BEADS ON THE ENDS OF LEAD LINED IRON PIPES.

No. 485,693. Patented Nov. 8, 1892.

WITNESSES:

INVENTOR:

UNITED STATES PATENT OFFICE.

GEORGE W. HARRINGTON, OF WAKEFIELD, MASSACHUSETTS, ASSIGNOR OF ONE-HALF TO D. H. DARLING, OF SAME PLACE.

METHOD OF FORMING BEADS ON THE ENDS OF LEAD-LINED IRON PIPES.

SPECIFICATION forming part of Letters Patent No. 485,693, dated November 8, 1892.

Application filed February 19, 1892. Serial No. 422,083. (No model.)

*To all whom it may concern:*

Be it known that I, GEORGE W. HARRINGTON, of Wakefield, in the county of Middlesex and State of Massachusetts, have invented certain new and useful Improvements in the Method of Forming Beads on the Ends of Lead-Lined Iron Pipes, of which the following is a specification.

This invention relates to lead-lined pipes, used particularly for service-pipes to connect water-mains with houses; and it has for its object to provide certain improvements in the formation of the ends of such pipes, whereby the lead lining may be caused to project to meet the lining of a coupling to which the pipe is screwed without being liable to injury by contact with the interior of the coupling when the pipe and coupling are being screwed together.

To this end the invention consists in the improvements which I will now proceed to describe and claim.

Figure 1:
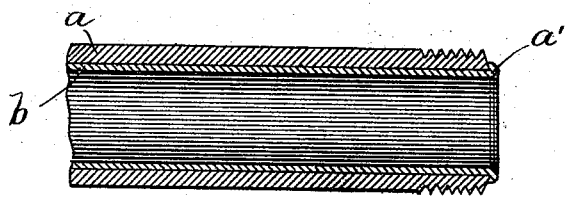
Figure 2:
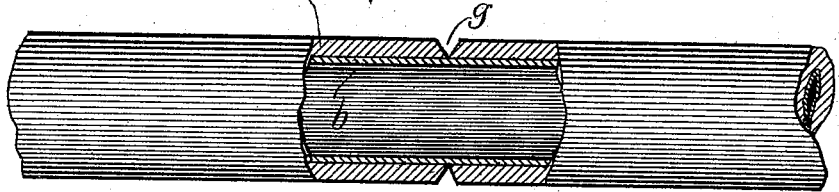
Figure 3:
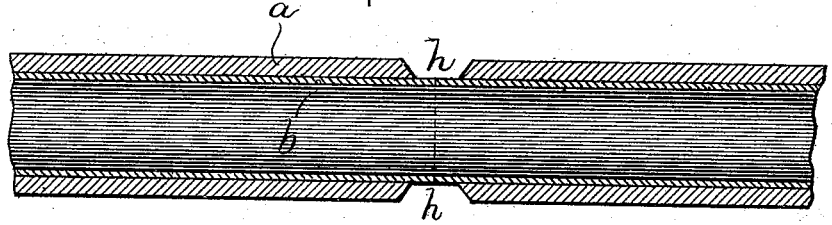
Figure 4:
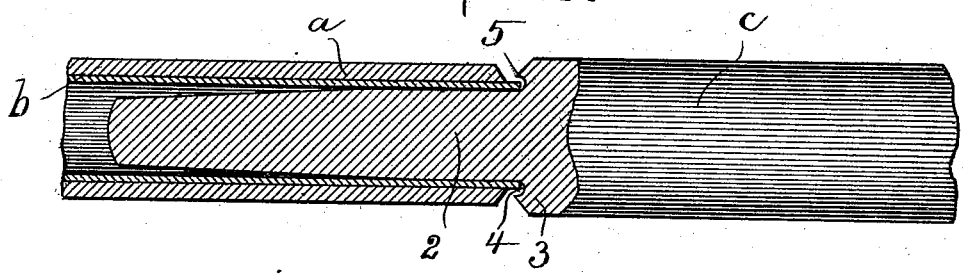

In the accompanying drawings, forming part of this specification, Figure 1 represents a longitudinal section of a lead-lined iron pipe having the end of the lead lining formed by my improved method. Figs. 2, 3, and 4 represent views showing the manner of forming the lead lining at the ends of the pipe.

The same letters and numerals of reference indicate the same parts in all the figures.

In the drawings, $a$ represents a wrought-iron pipe of the kind commonly used for service-pipes, and $b$ represents a lead lining in said pipe, said lining being composed of a tube of cold-pressed lead inserted in the pipe $a$ after it has been formed and expanded within the pipe, so that its outer surface is firmly pressed against the inner surface of the pipe. It is desirable to extend the lining outwardly upon the ends of the iron pipe, in order that the lead lining may project far enough to meet the lead lining in a coupling into which the iron pipe is screwed. Heretofore the lead lining has been extended beyond the ends of the iron pipe and turned outwardly to form a flat flange bearing upon and covering the end of the iron pipe, and presenting a flat annular surface, the width of which is substantially the same as that of the combined thickness of the iron pipe and the lead lining. I have found that a flange thus formed is liable to be cracked or broken by the torsional strain exerted upon it by contact with the corresponding shoulder in the coupling into which the pipe is screwed, so that the continuity of the lining is broken and fissures are formed therein which permit the access of water to the iron shell.

I obviate the objection above noted by forming the projecting portion of the lining into a narrow bead $a'$, which presents a convex surface to the corresponding shoulder in the coupling, and therefore has such a limited bearing upon the shoulder in the coupling that the torsional strain to which the projecting part of the lining is subjected during the operation of screwing the pipe into the coupling is not liable to crack or injure the lining in any way.

In forming the bead $a'$ I prefer to employ a tool $c$, such as is shown in Fig. 4, said tool comprising a plug 2, formed to fit somewhat closely the interior of the lining $b$ and an enlargement 3 on said plug, said enlargement having an annular die 4, formed to swage or strike up the projecting end of the lead lining and convert the same into the bead $a'$, and an annular cutter 5, surrounding said die, said cutter being formed to trim off the surplus lead which exudes between the die and the end of the iron pipe $a$. Preparatory to forming the bead $a'$ the lead lining is caused to project from the end of the pipe $a$, as shown in Fig. 4. The plug 2 is then inserted in the projecting end of the lining, and the tool of which said plug is a part is then driven onto the projecting end of the lining and against the end of the iron pipe, this operation causing the die 4 to form the bead $a'$, and the annular knife 5 to trim off the surplus lead around said bead. The bead thus formed is considerably narrower than the thickness of the pipe and, owing to its convex surface in cross-section, presents a limited bearing-surface to come in contact with the shoulder in the coupling that meets the projecting end of the lead lining.

In Figs. 2 and 3 I show the mode of operation that is adopted when a lead-lined service-pipe is to be cut in two to form two shorter lengths. I first sever the pipe $a$ by making a V-shaped cut $g$ therein, as shown in Fig. 2, without severing the lead lining. I then, by gently pulling the two sections of the iron pipe apart, stretch the lead lining, as indicated in Fig. 3, and finally I sever the lead lining at a point midway between the ends of the sections of the iron pipe, as indicated by the dotted line $h\,h$. I then proceed to convert the projecting ends of the lead lining into beads $a'$ in the manner above described.

I claim—

1. The method of forming beads on the ends of lead-lined pipes, the same consisting in first causing the end of the lead lining to project outside of the pipe, then swaging the projecting portion of the lining back onto the end of the pipe to form a bead, and rounding or beveling off the outer portion of the bead and trimming off its outer edge at a point not exceeding the outer circle of the pipe, substantially as described.

2. The method hereinbefore described of forming beads on the ends of sections of lead-lined pipe, the same consisting in first severing the pipe into sections without cutting the lining, then separating the sections and at the same time stretching the lining, then severing the lining between the separated ends of the sections, and finally forming the projecting ends of the lining into beads or flanges on the ends of the sections, as set forth.

In testimony whereof I have signed my name to this specification, in the presence of two subscribing witnesses, this 15th day of February, A. D. 1892.

GEORGE W. HARRINGTON.

Witnesses:
C. F. BROWN,
A. D. HARRISON.